United States Patent

Akeley

[15] 3,691,842
[45] Sept. 19, 1972

[54] DIFFERENTIAL PRESSURE TRANSDUCER

[72] Inventor: Lloyd T. Akeley, Fullerton, Calif.

[73] Assignee: Beckman Instruments, Inc.

[22] Filed: Sept. 8, 1970

[21] Appl. No.: 70,184

[52] U.S. Cl. .............................................. 73/398 C
[51] Int. Cl. ............................................... G01l 9/12
[58] Field of Search ........... 73/398 C, 407 R, 388 BN

[56] References Cited

UNITED STATES PATENTS

| | | | |
|---|---|---|---|
| 2,989,084 | 6/1961 | Jones | 73/407 UX |
| 3,572,319 | 3/1971 | Bitter et al. | 73/398 C |
| 3,313,158 | 4/1967 | Giovanni | 73/407 |

FOREIGN PATENTS OR APPLICATIONS

| | | | |
|---|---|---|---|
| 1,029,810 | 5/1966 | Great Britain | 73/407 |

*Primary Examiner*—Donald O. Woodiel
*Attorney*—James M. Thomson and Robert J. Steinmeyer

[57] ABSTRACT

A differential pressure transducer is disclosed. The transducer includes a substantially rigid housing having two opposed end faces, an internal cavity parallel to the two end faces, and a passage passing through the cavity and connecting the two end faces. A first pressure responsive diaphragm is disposed adjacent one of the end faces and sealed thereto along its periphery. A second pressure responsive diaphragm is disposed adjacent the second end face and is sealed thereto along its periphery. A rod extends through the passage and engages at each end a respective diaphragm. A movable plate is positioned in the cavity and attached to the rod so as to move with the rod. Two fixed plates are rigidly mounted in the cavity, one on each side of and spaced from the movable plate. Means are provided for connecting the three plates into a capacitance measuring circuit so that when the rod moves in response to differing pressures being sensed by the two diaphragms, the movable plate moves toward one fixed plate and away from the other, whereby a difference in capacitance between one fixed plate and the movable plate and the other fixed plate and the movable plate occurs which is a measure of the pressure differential being sensed by the diaphragms.

2 Claims, 1 Drawing Figure

PATENTED SEP 19 1972 3,691,842
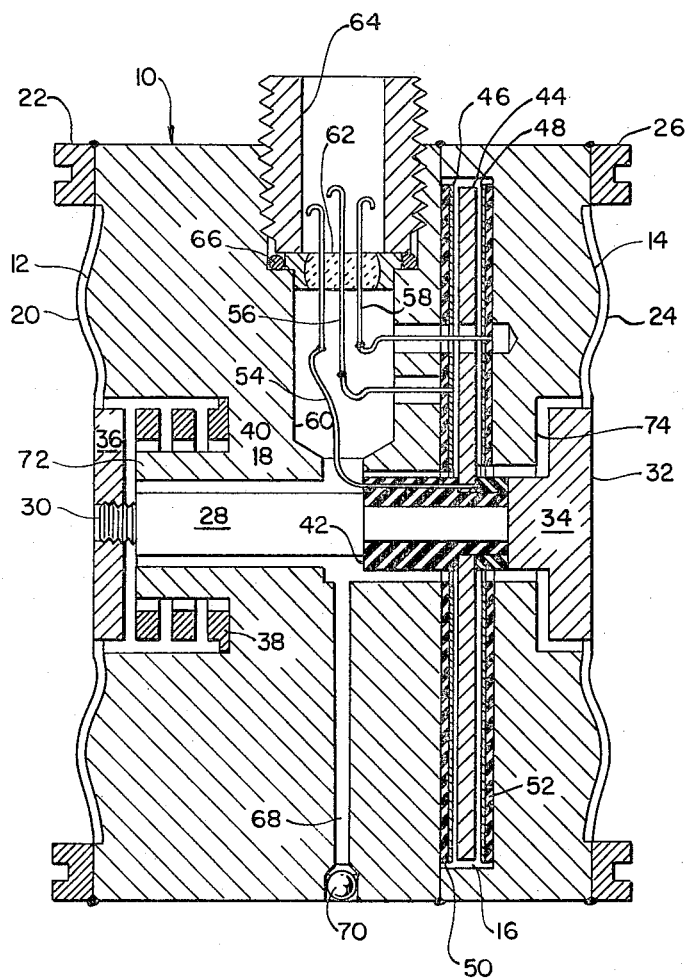
INVENTOR.
LLOYD T. AKELEY
BY William F. McDonald
ATTORNEY 3,691,842

DIFFERENTIAL PRESSURE TRANSDUCER

BACKGROUND OF THE INVENTION

The instant invention relates to a differential pressure transducer, in particular one which has variable capacitance elements for use in a capacitance or a differential capacitance measuring circuit wherein the capacitance or the differential capacitance measured is a function of the differential pressure sensed by the transducer.

Transducers or sensor gauges for differential pressure measuring are known. As discussed in U. S. Pat. No. 3,318,153 to Lode, these transducers, where adapted to use in a capacitance measuring circuit, generally have a movable plate in the form of a diaphragm separating two pressure chambers in each of which one of the fixed plates is situated. Any difference in pressure between the chambers will cause the diaphragm to deflect toward the lower pressure, thereby changing the electrical capacitances between the diaphragm and the two fixed plates. A related Lode U.S. Pat. No. 3,271,669 also provides additional background information.

The conventional arrangement wherein a flat sensing diaphragm deflects with pressure difference suffers because deflection is not a linear function of pressure and because capacitance change further is not a linear function of deflection, limiting operation to very small deflections, if near-linear performance is desired. When diaphragm thickness is used to control stiffness, and thus deflection, very close tolerances on thickness must be held. Also, the sensing diaphragm material must have a spring characteristic to minimize hysteresis and permanent offset with overrange.

SUMMARY OF THE INVENTION

It is an object of the instant invention to provide an improved differential pressure measuring transducer using a differential capacitance construction which does not depend upon a diaphragm as the moving plate. Advantageously such a transducer will have improved linearity and reproducibility of measurement. The measurements will not be affected by any distorting or uneven flexing of a sensing diaphragm under pressure.

The differential pressure measuring transducer of the instant invention includes a substantially rigid housing having two opposed end faces, an internal cavity parallel to the two end faces, and a passage passing through the cavity and connecting the two end faces. A first pressure responsive diaphragm is disposed adjacent one of the end faces and sealed thereto along its periphery. A second pressure responsive diaphragm is disposed adjacent the second end face and is sealed thereto along its periphery. A rod extends through the passage and engages at each end a respective diaphragm. A movable plate is positioned in the cavity and attached to the rod and is adapted to move with the rod. Two fixed plates are rigidly mounted in the cavity, one on each side of and spaced from the movable plate. Means are provided for connecting the three plates into a differential capacitance measuring circuit so that when the rod moves in response to differing pressures being sensed by the two diaphragms, the movable plate moves toward one fixed plate and away from the other, whereby a difference in capacitance, between one fixed plate and the movable plate, and the other fixed plate and the movable plate, occurs which is a measure of the pressure differential being sensed by the diaphragms.

If it is desired to fill the interior spaces of the transducer with fluid, the instant invention makes it possible to provide a single fill passage in the housing for filling the space between the diaphragms and the respective end faces, the passage, and the cavity with fluid.

The transducer of the instant invention may include means insulating the fixed plates from the housing and the rod.

One end of the rod may engage one diaphragm by means of a spring which resiliently bears against the corresponding end face of the housing. In some instances this may be advantageous in that the spring will contribute to the stiffness of the system. Thus the range of the transducer can be changed simply by changing springs.

When a fill passage is utilized to fill the interior spaces of the transducer with fluid, appropriate means may be provided for sealing the fill passage.

BRIEF DESCRIPTION OF THE DRAWING

Other objects and advantages of this invention will be apparent from the following description taken in conjunction with the accompanying drawing. The accompanying drawing is illustrative of an advantageous embodiment of this invention.

The single FIGURE of the drawing illustrates a differential pressure measuring transducer according to the instant invention.

DETAILED DESCRIPTION

Referring now to the single FIGURE of the drawing, the differential pressure transducer may be seen to include a substantially rigid housing indicated generally at 10. The housing 10 may be of any appropriate shape but conveniently is cylindrical. The housing 10 has two opposed end faces, 12 and 14. An internal cavity 16, parallel to end faces 12 and 14, is provided in housing 10. A passage 18 passes through cavity 16 and connects end faces 12 and 14. A first pressure responsive diaphragm 20 is disposed adjacent end face 12 and spaced slightly therefrom, except along its periphery. Diaphragm 20 is sealed to end face 12 along its periphery as by clamping ring 22 which, for example, may be welded to end face 12. A second pressure responsive diaphragm 24 is disposed adjacent second end face 14 and also spaced therefrom except along its periphery. Diaphragm 24 is sealed to end face 14 along its periphery in any appropriate means as by second clamping ring 26 which may, for example, be welded to end face 14.

A rod 28, of any appropriate shape but desirably cylindrical, extends through passage 18 and engages at each end 30, 32 a respective diaphragm, e.g. 20, 24. As illustrated, the engagement may be effected by means of a cap 34 formed on end 32 of rod 28. Cap 36 is threaded onto end 30 of rod 28 and may advantageously include a spring element 38 which resiliently bears against a depressed area 40 of end face 12. A sleeve 42 of insulating material is provided around rod 28 adjacent cavity 16. A movable plate 44 is positioned in cavity 16 and attached to rod 28 by means of sleeve 42 and is adapted to move with rod 28. Two fixed plates 46, 48 are rigidly mounted in cavity 16 as by electrical insulation 50 and 52, one on each side of and spaced from movable plate 44. Although the faces of all plates, 44, 46, and 48, are shown as planar, in some circumstances, any or all of them could be non-planar to achieve a particular characteristic of capacity change versus displacement. End 30 of rod 28 may be adjustably positioned, via the threads, with respect to spring 38 so as to position movable plate 44 with respect to fixed plates 46, 48 at zero differential pressure. Means such as electrical leads 54, 56, and 58 are provided for connecting the three plates, 44, 46, and 48 into a capacitance measuring circuit (not shown). The three electrical leads 54, 56, and 58 come out through housing 10 by means of a passage 60 and pass through electrical header 62. A plug 64 threadably engaged with housing 10 supports header 62 against internal pressure and with the help of seal ring 66, seals header 62 to housing 10.

A fill passage 68 is provided in housing 10 for filling the interior space thereof, i.e., the space between diaphragms 20 and 24 and their respective end faces 12 and 14, passage 18 (and 60 where provided), and cavity 16 with an appropriate fluid such as insulating oil. The fluid preferably is essentially noncompressible and has the desired electrical insulating and dielectric properties and proper damping characteristics. Means such as a ball 70 welded into the outer end of fill passage 68 may be utilized to seal fill passage 68 when the interior of housing 10 has been filled.

The transducer may be connected into any appropriate differential capacitance measuring circuit. Exemplary capacitance measuring circuits may be found in the two Lode patents referenced above. In use, the transducer is connected so that any difference in pressure being felt by the two diaphragms 20, and 24 will cause the diaphragms to deflect toward the lower pressure. The movement of the diaphragms in turn will cause the rod 28 to move and with it movable plate 44. Movable plate 44 will move toward one fixed plate, for example plate 48 and away from the other fixed plate, plate 46. This will change the electrical capacitances between movable plate 44 and the two fixed plates 46 and 48. In other words, a difference in capacitance between fixed plate 48 and movable plate 44, and fixed plate 46 and movable plate 44 will occur. This capacitance difference is a measure of the pressure differential being sensed by diaphragms 20 and 24. If it is desired to change the stiffness, i.e. range of the transducer system, this can be accomplished when a spring element 38 is used simply by changing spring element 38.

Overrange protection may be provided by the matching contours of end faces 12 and 14 and their respective diaphragms 20 and 24 as well as shoulders 72 and 74 against which caps 36 and 34 may seat. For example, if diaphragm 20 is exposed to the higher pressure, at a given overload it will seat against end face 12. At the same time cap 36 will seat against shoulder 72. The result is no additional pressure can be transferred into the system.

It will be appreciated that the foregoing is a description of an exemplary embodiment of the instant invention.

This is for illustrative purposes only and the instant invention is not to be limited thereby but only by the claims wherein what is claimed is:

1. A differential pressure measuring transducer comprising:
    a. a substantially rigid housing having two opposed end faces, an internal cavity parallel to the two end faces, and a passage extending through the cavity and connecting the two end faces, said end faces being formed to define oppositely extending contoured surfaces concentric with said passage;
    b. a first pressure responsive diaphragm disposed adjacent one of said end faces, said diaphragm including a thin round central disc positioned opposite to and over-extending the edges of one end of said passage, and a thin circular outer portion secured to said disc having a shape matching the contoured surface of a corresponding end plate, the periphery of said diaphragm being sealed to the end face of said housing;
    c. a second pressure responsive diaphragm disposed adjacent the other end face, said diaphragm including a thin round central disc positioned opposite to and over-extending the edges of the other end of said passage, and a thin circular outer portion secured to said disc having a shape matching the contoured surface of the other corresponding end plate, the periphery of said diaphragm being sealed to the other end face of said housing;
    d. a rod extending through the passage, one end of said rod adjustably engaging the central disc of one of said diaphragms and the other end of said rod fixedly engaging the central disc of the other of said diaphragms;
    e. a resilient spring disposed between said housing and the central disc of one of said diaphragms to oppose movement of said diaphragm in response to fluid pressure, said spring means having a predetermined force whereby the outer portion of said diaphragm is adapted to seat against the end face and the central disc of the diaphragm is adapted to close the passage at a given pressure so that overrange pressure protection is provided;
    f. a movable plate positioned in the cavity and attached to the rod, adapted to move with the rod, said plate being insulated from said rod;
    g. two fixed plates rigidly mounted in the cavity and insulated from the housing, one on each side of and spaced from the movable plate;
    h. electrical means for connecting the three plates into a differential capacitance measuring circuit so that as the rod moves in response to differing pressures sensed by the two diaphragms, the movable plate moves toward one fixed plate and away from the other fixed plate, whereby a difference in capacitance between one fixed plate and the movable plate and the other fixed plate and the movable plate occurs which is proportional to the pressure differential sensed by the diaphragms.

2. The transducer of claim 1 wherein the housing includes a fill passage adapted for filling the space between the diaphragms and their respective end faces, the passage, and the cavity with fluid, and means for sealing the fill passage.

* * * * *